United States Patent [19]
Kim et al.

[11] Patent Number: 5,448,640
[45] Date of Patent: Sep. 5, 1995

[54] PARALLEL DISTRIBUTED SAMPLE DESCRAMBLING CIRCUIT FOR CELL-BASED ASYNCHRONOUS TRANSFER MODE PHYSICAL LAYER

[75] Inventors: Young S. Kim; Song I. Choi; Hong S. Park, all of Daejeon, Rep. of Korea

[73] Assignees: Electronics and Telecommunications Research Institute, Daejeon; Korea Telecommunications Authority, Seoul, both of Rep. of Korea

[21] Appl. No.: 213,709

[22] Filed: Mar. 16, 1994

[30] Foreign Application Priority Data

Mar. 18, 1993 [KR] Rep. of Korea ............... 1993-4207

[51] Int. Cl.$^6$ .................... H04L 9/26; H04J 3/06
[52] U.S. Cl. ....................... 380/48; 380/46; 380/49; 370/107
[58] Field of Search ............. 380/46, 47, 50, 48, 380/49; 370/107

[56] References Cited

U.S. PATENT DOCUMENTS

| | | | |
|---|---|---|---|
| 4,719,643 | 1/1988 | Beeman | 370/107 X |
| 5,163,092 | 11/1992 | McNesby et al. | 380/28 |
| 5,245,661 | 9/1993 | Lee et al. | 380/50 |
| 5,257,311 | 10/1993 | Naito et al. | 380/48 |
| 5,283,831 | 2/1994 | Cook et al. | 380/48 |
| 5,321,754 | 6/1994 | Fisher et al. | 380/48 |
| 5,349,611 | 9/1994 | Varian | 370/107 X |
| 5,355,415 | 10/1994 | Lee et al. | 380/47 |

*Primary Examiner*—Gilberto Barrón, Jr.
*Attorney, Agent, or Firm*—Spencer, Frank & Schneider

[57] ABSTRACT

A parallel distributed sample descrambler part for a cell-based ATM physical layer, comprising a PRBS generator for generating an 8-bit random number when being set to any value other than "0" in response to an initial value set signal upon initialization, to execute a generation polynomial for distributed sample descrambling given by $x^{31}+x^{28}+1$, and a descrambler for adding 8 bits of reception data to 8 bits of the random number from the PRBS generator, respectively, to perform the descrambling of the reception data and outputting the descrambled data bits. A sample processor extracts two bits for synchronization of the descrambler from the 8-bit random number from the PRBS generator as first and second samples in response to an external sampling clock and an external synchronous clock. The sample processor also extracts highest first and second bits of a syndrome signal from a cell delineation part in a cell-based ATM physical layer receiver as transmitter PRBS samples in response to the external sampling clock and the external synchronous clock. The sample processor compares the extracted first and second samples and the extracted syndrome signal highest first and second bits with each other and outputs first and second synchronous signals for the PRBS generator in accordance with the compared result.

5 Claims, 9 Drawing Sheets

PARALLEL DISTRIBUTED SAMPLE DESCRAMBLING CIRCUIT FOR CELL-BASED ASYNCHRONOUS TRANSFER MODE PHYSICAL LAYER

BACKGROUND OF THE INVENTION

1. Field of the Invention

The present invention relates to a parallel distributed sample descrambler partfor a cell-based asynchronous transfer mode (referred to hereinafter as ATM) physical layer recommended by CCITT I.432.

2. Description of the Prior Art

Generally, scrambling transmission data at a transmitter side is very useful in data communications as it offers many advantages. The scrambling suppresses continuous generation of the same signal ("1" or "0") to make clock extraction at a receiver side easy. Also, the scrambling randomizes the transmission data to reduce interference effects between codes. At the receiver side, descrambling the scrambled data is performed to recover original information therefrom and transfer the recovered information to the user. CCITT I.432 has recommended a distributed sample scrambler for a cell-based ATM physical layer which is a kind of frame-synchronous scrambler, whose a characteristic polynomial is given by $x^{31}+x^{28}+1$.

With the distributed sample scrambler, the scrambling is performed with respect to ATM cell 53 octets, except the 5th octet corresponding to a header error control (HEC) code. Samples of a pseudo random bit sequence (PRBS) generator are taken periodically and transmitted to the receiver side. At the receiver side, PRBS of a descrambler is synchronized with that of the scrambler at the transmitter side using the samples of the PRBS generator.

Using the conventional serial scrambling, there is required a semiconductor device with an operation speed higher than 155.52 Mbps or 622.080 Mbps which is a transmission speed of the ATM physical layer, for the purpose of implementation of the descrambler. However, such a semiconductor device is high in cost and difficult to construct.

SUMMARY OF THE INVENTION

Therefore, the present invention has been made in view of the above problem, and it is an object of the present invention to provide a parallel distributed sample descrambler partfor a cell-based ATM physical layer in which an operation speed of the circuit can be reduced (for example, to 19.44 Mbps when a transmission speed of the ATM physical layer is 155.52 Mbps) by an 8-bit parallel process using a general semiconductor.

In accordance with the present invention, the above and other objects can be accomplished by a provision of a parallel distributed sample descrambler partfor a cell-based ATM physical layer, comprising PRBS generation means for generating an 8-bit random number when being set to any value other than "0" in response to an initial value set signal upon initialization, to execute a generation polynomial for distributed sample descrambling given by $x^{31}+x^{28}+1$; descrambling means for adding 8 bits of reception data to 8 bits of the random number from said PRBS generation means, respectively, to perform the descrambling of the reception data and outputting the descrambled data bits; and sample processing means responsive to an external sampling clock and an external synchronous clock, for extracting two bits for synchronization of said descrambling means from the 8-bit random number from said PRBS generation means as first and second samples, extracting highest first and second bits of a syndrome signal from a cell delineation part in a cell-based ATM physical layer receiver as transmitter PRBS samples, comparing the extracted first and second samples and the extracted syndrome signal highest first and second bits with each other and outputting first and second synchronous signals for said PRBS generation means in accordance with the compared result.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
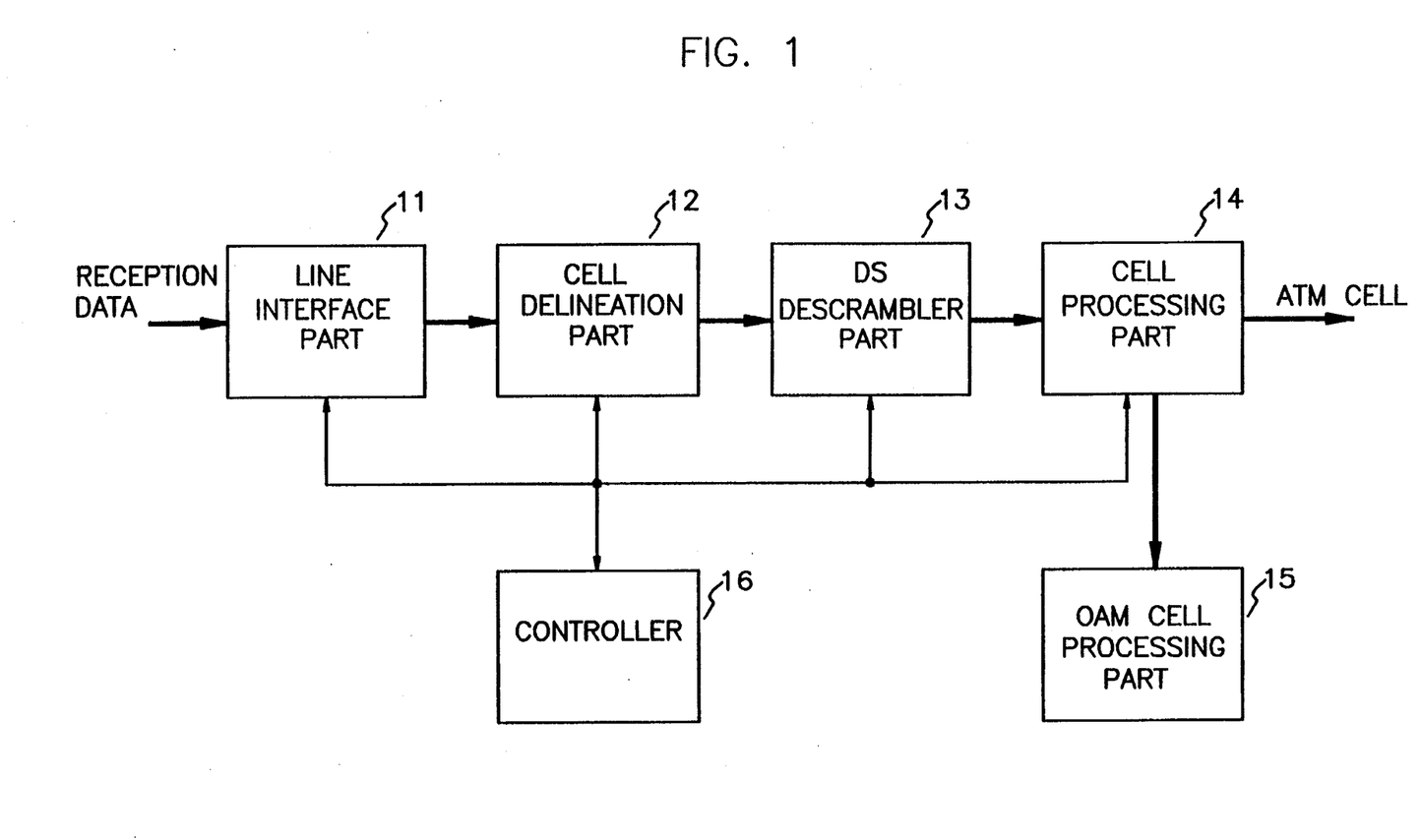
FIG. 1 is a block diagram of a cell-based ATM physical layer receiver to which the present invention is applied.

Referring to FIG. 1, there is shown a block diagram of a cell-based ATM physical layer receiver to which the present invention is applied. As shown in this drawing, the cell-based ATM physical layer receiver comprises a controller 16 for generating a clock as a control signal, a line interface part 11 for receiving ATM cell data from a transmission medium and extracting a clock from the received ATM cell data, a cell delineation part 12 for calculating a syndrome using a HEC code of the ATM cell data received by the line interface part 11 to find a cell boundary, a distributed sample (DS) descrambler part 13 for descrambling the ATM cell data synchronized by the cell delineation part 12, a cell processimg part 14 connected to the DS descrambler part 13 for discriminating whether a received cell is an ATM cell or an operation and administration maintenance (OAM) cell and transmitting the discriminated ATM cell to an ATM layer, and an OAM cell processing part 15 for receiving the OAM cell from the cell processing part 14 and performing an operation administration maintenance of the received OAM cell.

Figure 2:
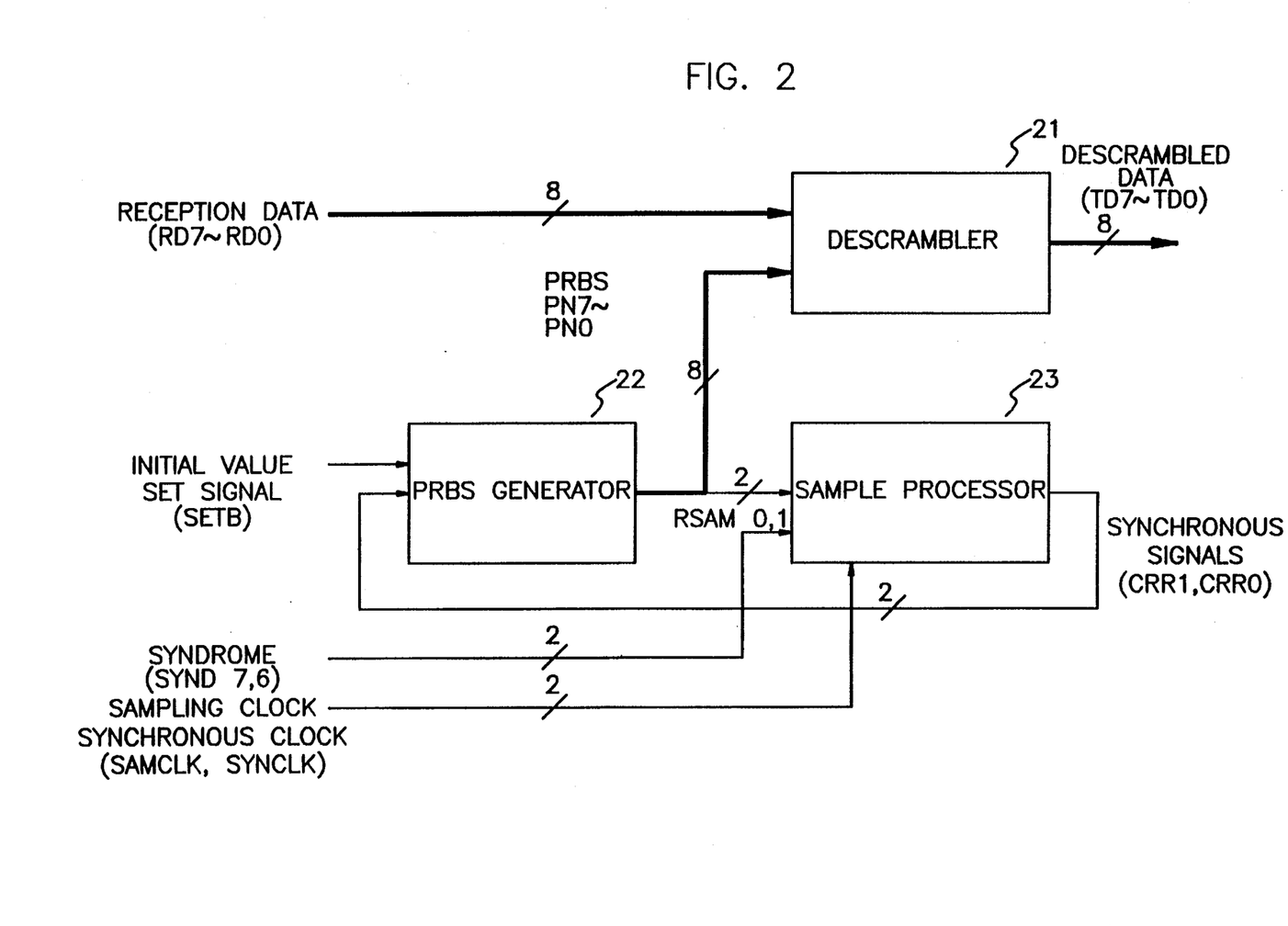
FIG. 2 is a block diagram of a parallel distributed sample descrambler partin the receiver in FIG. 1 in accordance with the present invention.

Referring to FIG. 2, there is shown a block diagram of the parallel DS descrambler part 13 in the receiver in FIG. 1 in accordance with the present invention. As shown in this drawing, the DS descrambler part 13 comprises a descrambler 21, a PRBS generator 22 and a sample processor 23.

The PRBS generator 22 is adapted to generate an 8-bit random number when being set to any value other than "0" in response to an initial value set signal SETB upon initialization, to execute a generation polynomial $(x^{31}+x^{28}+1)$ for distributed sample-descrambling.

The descrambler 21 is adapted to add 8 bits RD7–RD0 of reception data to 8 bits PN7–PN0 of the random number from the PRBS generator 22, respectively, to perform the descrambling of the reception data and output the descrambled data bits TD7–TD0.

The sample processor 23 is adapted to extract two bits for synchronization of the descrambler 21 from the 8-bit random number from the PRBS generator 22 as first and second samples RSAM1 and RSAM0 in response to an external sampling clock SAMCLK and an external synchronous clock SYNCLK. Namely, the 2nd bit of the random number to be added to the 5th octet ATM cell is extracted as the first sample RSAM1 and the 6th bit of the random number to be added to the 31st octet ATM cell is extracted as the second sample RSAM0.

Also, the sample processor 23 extracts highest first and second bits SYND7 and SYND6 of a syndrome signal from the cell delineation part 12 in the cell-based ATM physical layer receiver as transmitter PRBS samples in response to the external sampling clock SAMCLK and the external synchronous clock SYNCLK.

The sample processor 23 compares the extracted first and second samples RSAM1 and RSAM0 and the extracted syndrome signal highest first and second bits SYND7 and SYND6 with each other and outputs first and second synchronous signals CRR1 and CRR0 for the PRBS generator 22 in accordance with the compared result.

The transmitter PRBS samples are added to highest 2 bits of the HEC code and transmitted to the receiver. The HEC code is in the form of addition of B'01010101 to a CRC code regarding cell header 4 octets. In the presence of no error, calculating the syndrome using a CRC generation polynomial, the result is B'01010101. Because the transmitter PRBS samples have been added to the syndrome, they are the highest first bit and the inverted highest second bit of the syndrome calculated by the cell delineation part 12.

Figure 3:
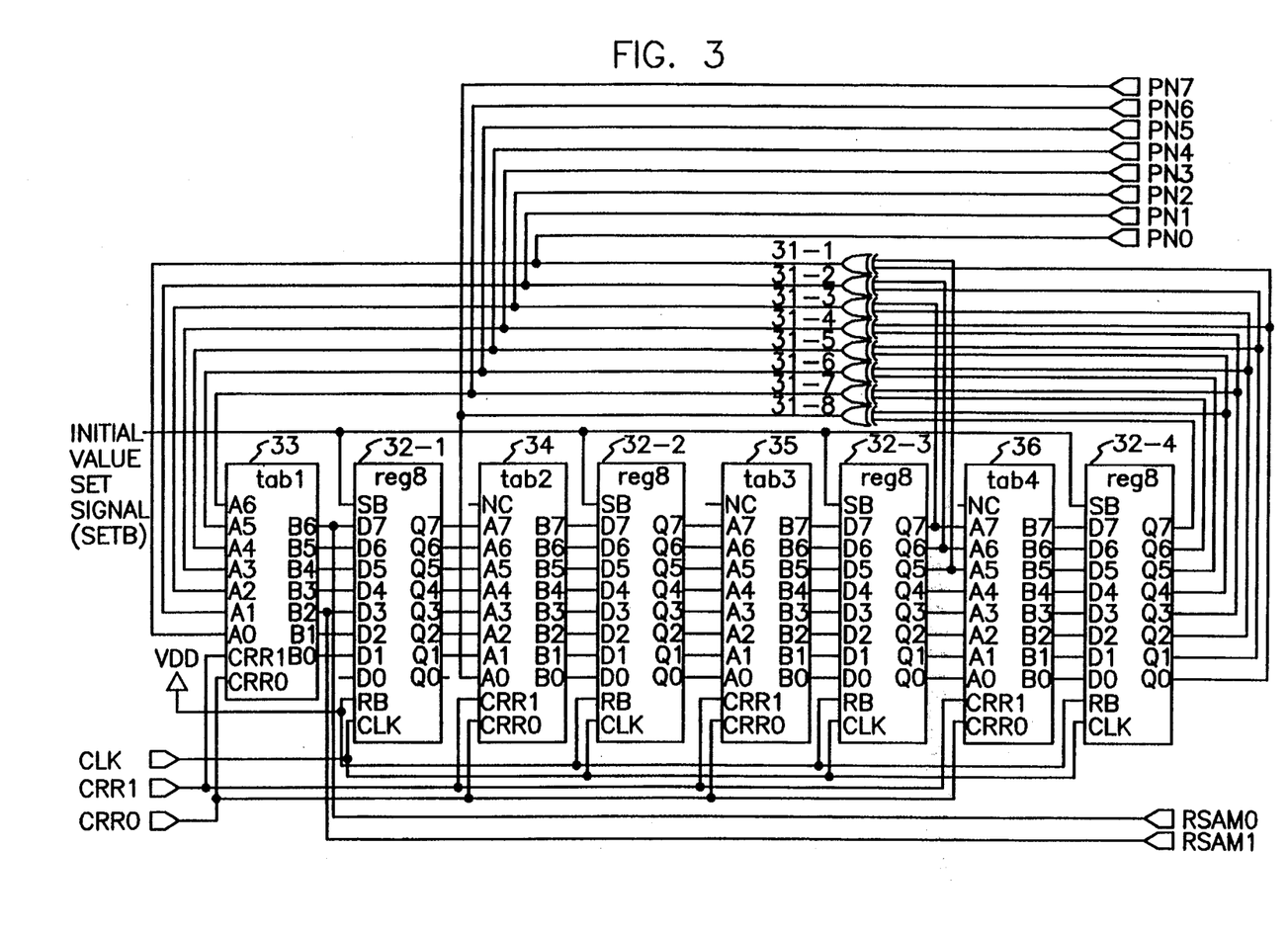
FIG. 3 is a circuit diagram of a PRBS generator in the descrambler partin FIG. 2.

Referring to FIG. 3, there is shown a circuit diagram of the PRBS generator 22 in the descrambler partin FIG. 2. As shown in this drawing, the PRBS generator 22 includes first to fourth-stage registers 32-1 to 32-4 connected in series, each of which has a set terminal SB for inputting the initial value set signal SETB.

First to eighth exclusive-OR gates 31-8 to 31-1 are provided in the PRBS generator 22 to input outputs from the third and fourth-stage registers 32-3 and 32-4 and output the 8 bits PN7–PN0 of the random number, respectively.

A first correction circuit 33 is connected between output terminals of the second to eighth exclusive-OR gates 31-7 to 31-1 and input terminals of the first-stage register 32-1 to transfer the second to eighth bits PN6–PN0 of the random number from the second to eighth exclusive-OR gates 31-7 to 31-1 except the first bit PN7 from the first exclusive-OR gate 31-8 to the first-stage register 32-1.

A second correction circuit 34 is connected between output terminals of the first-stage register 32-1 and the first exclusive-OR gate 31-8 and input terminals of the second-stage register 32-2 to transfer a 7-bit output from the first-stage register 32-1 and the first bit PN7 from the first exclusive-OR gate 31-8 to the second-stage register 32-2.

A third correction circuit 35 is connected between output terminals of the second-stage register 32-2 and input terminals of the third-stage register 32-3 to transfer an 8-bit output from the second-stage register 32-2 to the third-stage register 32-3.

A fourth correction circuit 36 is connected between output terminals of the third-stage register 32-3 and input terminals of the fourth-stage register 32-4 to transfer an 8-bit output from the third-stage register 32-3 to the fourth-stage register 32-4.

Each of the first to fourth correction circuits 33–36 inverts input transition data to a corresponding one of the first to fourth-stage registers 32-1 to 32-4 in response to the first and second synchronous signals CRR1 and CRR0 from the sample processor 23.

The parallel PRBS from the first to eighth exclusive-OR gates 31-8 to 31-1 satisfies the generation polynomial $(x^{31}+x^{28}+1)$.

The output bit B6 (the second bit of the random number) and the output bit B2 (the sixth bit of the random number) from the correction circuit 33 are extracted as the first and second samples RSAM0 and RSAM1 by the sample processor 23.

Here, the reference numeral CLK, not described, designates a system clock supplied to the-stage registers 32-1 to 32-4.

Figure 4:
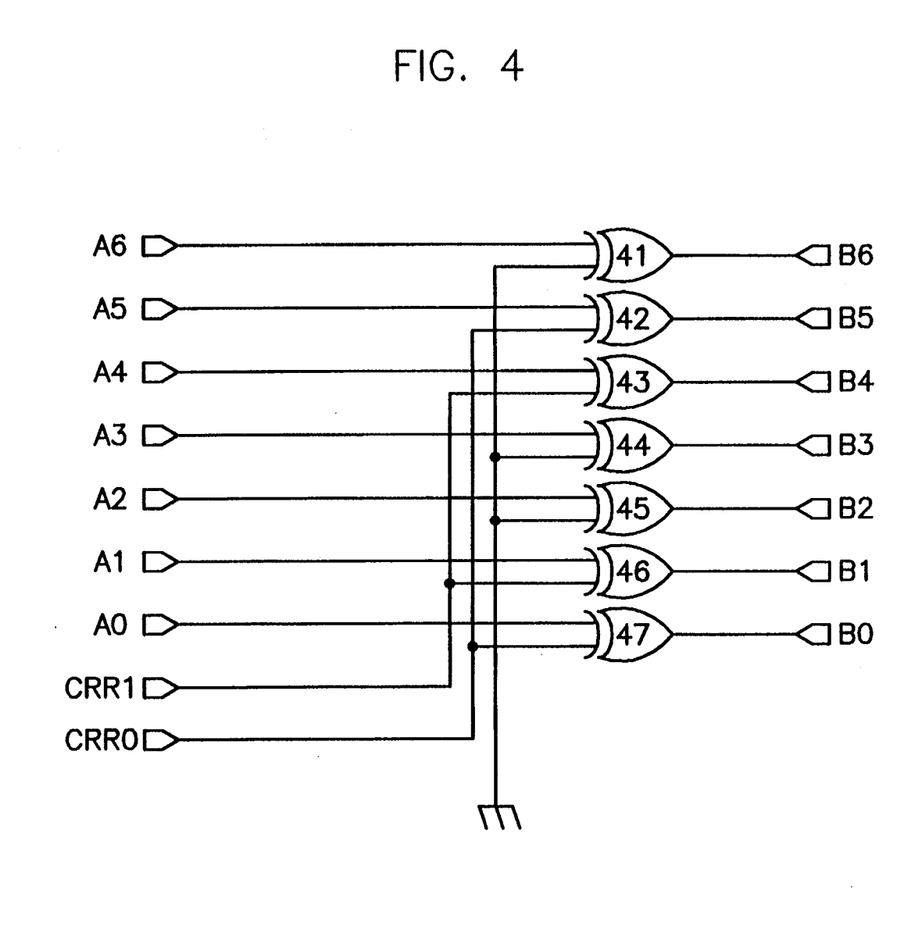
FIGS. 4 to 7 are circuit diagrams of correction circuits in the PRBS generator in FIG. 3, respectively.

Referring to FIG. 4, there is shown a circuit diagram of the first correction circuit 33 in the PRBS generator 22 in FIG. 3. As shown in this drawing, the first correction circuit 33 includes an exclusive-OR gate 41 having one input terminal for inputting the second bit PN6 of the PRBS random number from the second exclusive-OR gate 31-7, the other input terminal connected to a ground and an output terminal for outputting a corrected bit.

An exclusive-OR gate 42 has one input terminal for inputting the third bit PN5 of the PRBS random number from the third exclusive-OR gate 31-6, the other input terminal for inputting the second synchronous signal CRR0 from the sample processor 23 and an output terminal for outputting a corrected bit.

An exclusive-OR gate 43 has one input terminal for inputting the fourth bit PN4 of the PRBS random number from the fourth exclusive-OR gate 31-5, the other input terminal for inputting the first synchronous signal CRR1 from the sample processor 23 and an output terminal for outputting a corrected bit.

An exclusive-OR gate 44 has one input terminal for inputting the fifth bit PN3 of the PRBS random number from the fifth exclusive-OR gate 31-4, the other input terminal connected to the ground and an output terminal for outputting a corrected bit.

An exclusive-OR gate 45 has one input terminal for inputting the sixth bit PN2 of the PRBS random number from the sixth exclusive-OR gate 31-3, the other input terminal connected to the ground and an output terminal for outputting a corrected bit.

An exclusive-OR gate 46 has one input terminal for inputting the seventh bit PN1 of the PRBS random number from the seventh exclusive-OR gate 31-2, the other input terminal for inputting the first synchronous signal CRR1 from the sample processor 23 and an output terminal for outputting a corrected bit.

An exclusive-OR gate 47 has one input terminal for inputting the eighth bit PN0 of the PRBS random number from the eighth exclusive-OR gate 31-1, the other input terminal for inputting the second synchronous signal CRR0 from the sample processor 23 and an output terminal for outputting a corrected bit.

Figure 5:
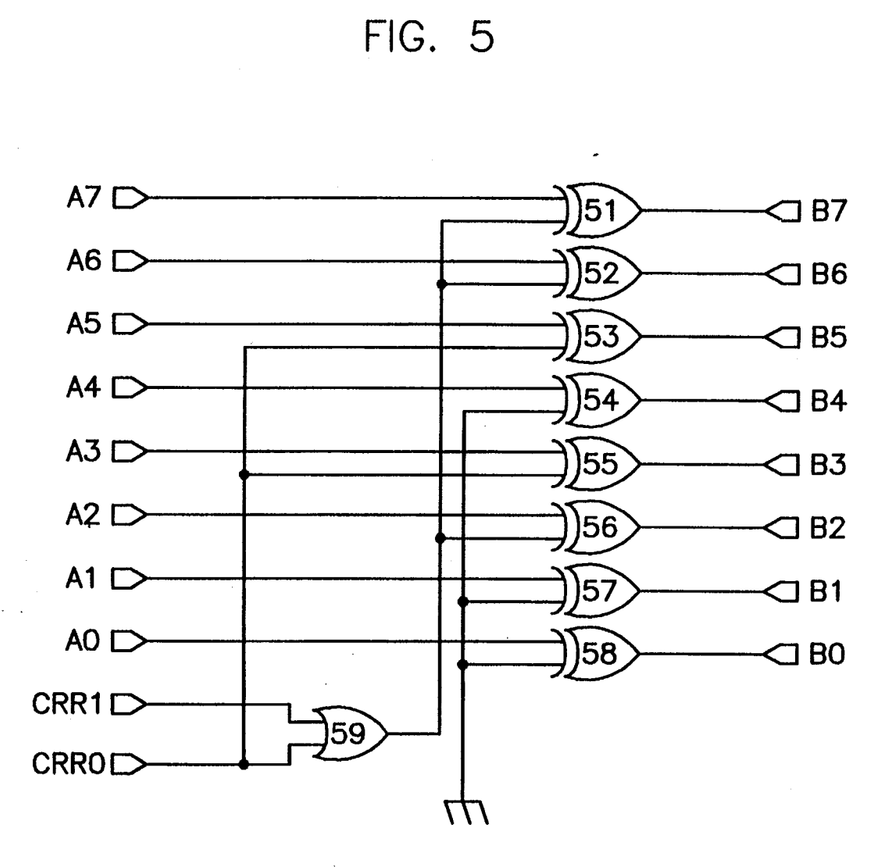

Referring to FIG. 5, there is shown a circuit diagram of the second correction circuit 34 in the PRBS generator 22 in FIG. 3. As shown in this drawing, the second correction circuit 34 includes an OR gate 59 for ORing the first and second synchronous signals CRR1 and CRR0 from the sample processor 23 and an exclusive-OR gate 51 having one input terminal for inputting the first bit from the first-stage register 32-1, the other input terminal for inputting an output signal from the OR gate 59 and an output terminal for outputting a corrected bit.

An exclusive-OR gate 52 has one input terminal for inputting the second bit from the first-stage register 32-1, the other input terminal for inputting the output signal from the OR gate 59 and an output terminal for outputting a corrected bit.

An exclusive-OR gate 53 has one input terminal for inputting the third bit from the first-stage register 32-1, the other input terminal for inputting the second synchronous signal CRR0 from the sample processor 23 and an output terminal for outputting a corrected bit.

An exclusive-OR gate 54 has one input terminal for inputting the fourth bit from tile first-stage register 32-1, the other input terminal connected to the ground and an output terminal for outputting a corrected bit.

An exclusive-OR gate 55 has one input terminal for inputting the fifth bit from the first-stage register 32-1, the other input terminal for inputting the second synchronous signal CRR0 from the sample processor 23 and an output terminal for outputting a corrected bit.

An exclusive-OR gate 56 has one input terminal for inputting the sixth bit from the first-stage register 32-1, the other input terminal for inputting the output signal from the OR gate 59 and an output terminal for outputting a corrected bit.

An exclusive-OR gate 57 has one input terminal for inputting the seventh bit from the first-stage register 32-1, the other input terminal connected to the ground and an out-put terminal for outputting a corrected bit.

An exclusive-OR gate 58 has one input terminal for inputting the first bit PN7 of the PRBS random number from the first exclusive-OR gate 31-8, the other input terminal connected to the ground and an output terminal for outputting a corrected bit.

Figure 6:
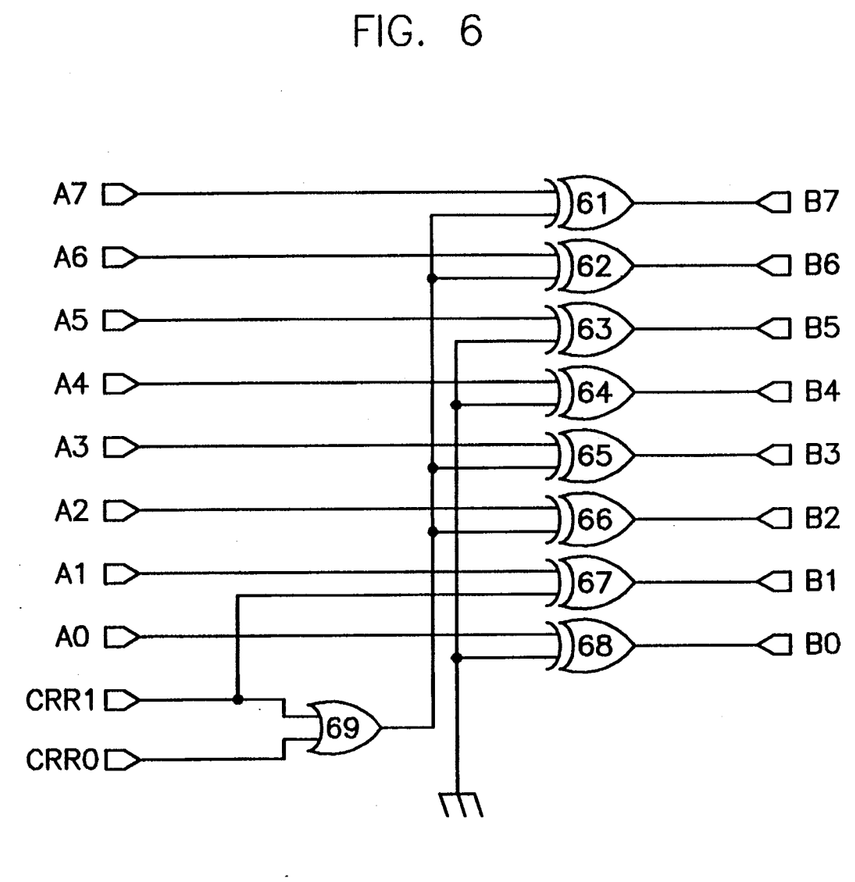

Referring to FIG. 6, there is shown a circuit diagram of the third correction circuit 35 in the PRBS generator 22 in FIG. 3. As shown in this drawing, the third correction circuit 35 includes an OR gate 69 for ORing the first and second synchronous signals CRR1 and CRR0 from the sample processor 23 and an exclusive-OR gate 61 having one input terminal for inputting the first bit from the second-stage register 32-2, the other input terminal for inputting an output signal from the OR gate 69 and an output terminal for outputting a corrected bit.

An exclusive-OR gate 62 has one input terminal for inputting the second bit from the second-stage register 32-2, the other input terminal for inputting the output signal from the OR gate 69 and an output terminal for outputting a corrected bit.

An exclusive-OR gate 63 has one input terminal for inputting the third bit from the second-stage register 32-2, the other input terminal connected to the ground and an output terminal for outputting a corrected bit.

An exclusive-OR gate 64 has one input terminal for inputting the fourth bit from the second-stage register 32-2, the other input terminal connected to the ground and an output terminal for outputting a corrected bit.

An exclusive-OR gate 65 has one input terminal for inputting the fifth bit from the second-stage register 32-2, the other input terminal for inputting the output signal from the OR gate 69 and an output terminal for outputting a corrected bit.

An exclusive-OR gate 66 has one input terminal for inputting the sixth bit from the second-stage register 32-2 the other input terminal for inputting the output signal from the OR gate 69 and an output terminal for outputting a corrected bit.

An exclusive-OR gate 67 has one input terminal for inputting the seventh bit from the second-stage register 32-2, the other input terminal for inputting the first synchronous signal CRR1 from the sample processor 23 and an output terminal for outputting a corrected bit.

An exclusive-OR gate 68 has one input terminal for inputting the eighth bit from the second-stage register 32-2, the other input terminal connected to the ground and an output terminal for outputting a corrected bit.

Figure 7:
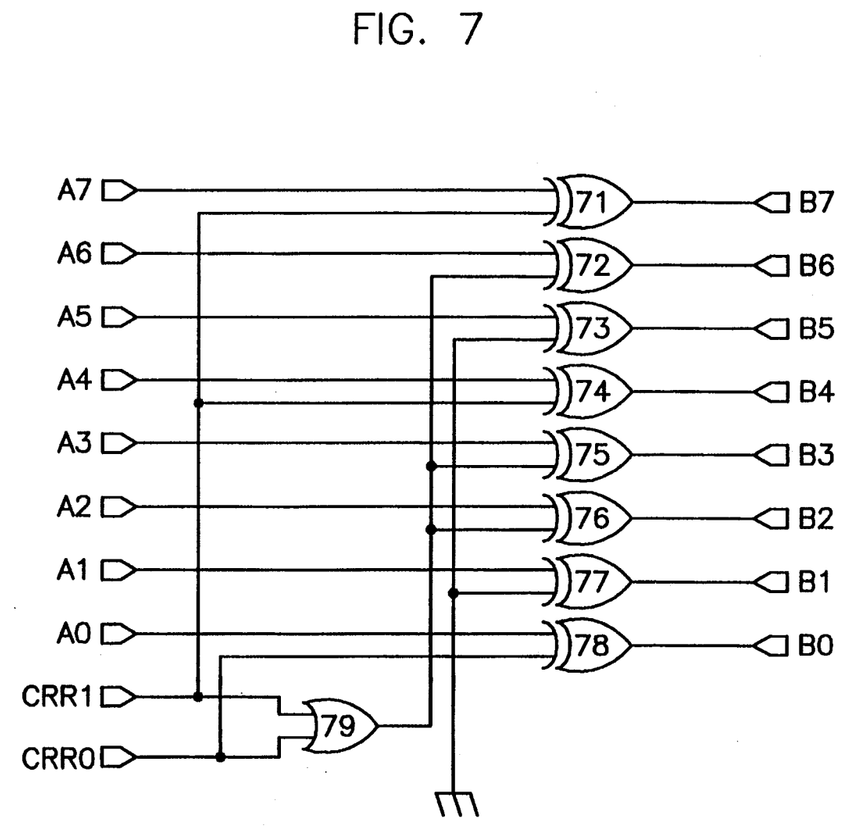

Referring to FIG. 7, there is shown a circuit diagram of the fourth correction circuit 36 in the PRBS generator 22 in FIG. 3. As shown in this drawing, the fourth correction circuit 36 includes an OR gate 79 for ORing the first and second synchronous signals CRR1 and CRR0 from the sample processor 23 and an exclusive-OR gate 71 having one input terminal for inputting the first bit from the third-stage register 32-3, the other input terminal for inputting the first synchronous signal CRR1 from the sample processor 23 and an output terminal for outputting a corrected bit.

An exclusive-OR gate 72 has one input terminal for inputting the second bit from the third-stage register 32-3, the other input terminal for inputting an output signal from the OR gate 79 and an output terminal for outputting a corrected bit.

An exclusive-OR gate 73 has one input terminal for inputting the third bit from the third-stage register 32-3, the other input terminal connected to the ground and an output terminal for outputting a corrected bit.

An exclusive-OR gate 74 has one input terminal for inputting the fourth bit from the third-stage register 32-3, the other input terminal for inputting the first synchronous signal CRR1 from the sample processor 23 and an output terminal for outputting a corrected bit.

An exclusive-OR gate 75 has one input terminal for inputting the fifth bit from the third-stage register 32-3, the other input terminal for inputting the output signal from the OR gate 79 and an output terminal for outputting a corrected bit.

An exclusive-OR gate 76 has one input terminal for inputting the sixth bit from the third-stage register 32-3, the other input terminal for inputting the output signal from the OR gate 79 and an output terminal for outputting a corrected bit.

An exclusive-OR gate 77 has one input terminal for inputting the seventh bit from the third-stage register 32-3, the other input terminal connected to the ground and an output terminal for outputting a corrected bit.

An exclusive-OR gate 78 has one input terminal for inputting the eighth bit from the third-stage register 32-3, the other input terminal for inputting the second synchronous signal CRR0 from the sample processor 23 and an output terminal for outputting a corrected bit.

As mentioned above with reference to FIGS. 4 to 7, each of the first to fourth correction circuits 33-36 inverts bits for correction only when the first and second synchronous signals CRR1 and CRR0 from the sample processor 23 are logically "high", and applies the inverted bits to a corresponding one of the first to fourth-stage registers 32-1 to 32-4.

Figure 8:
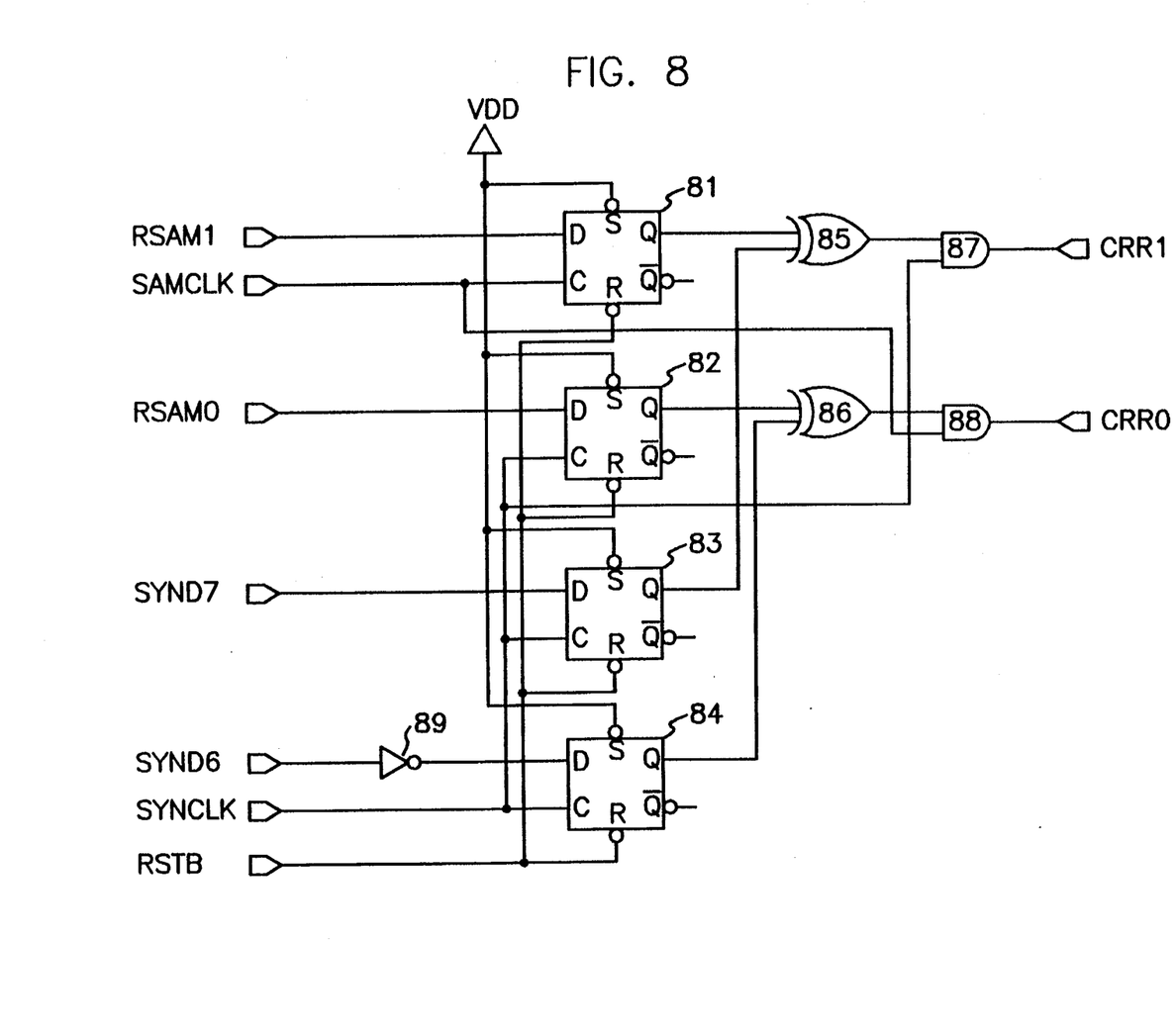
FIG. 8 is a circuit diagram of a sample processor in the descrambler partin FIG. 2.

Referring to FIG. 8, there is shown a circuit diagram of the sample processor 23 in the descrambler partin FIG. 2. As shown in this drawing, the sample processor 23 includes a D flip-flop 81 for latching the first sample RSAM1 extracted from the PRBS generator 22 in response to the external sampling clock SAMCLK, a D flip-flop 82 for latching the second sample RSAM0 extracted from the PRBS generator 22 in response to the external synchronous clock SYNCLK, a D flip-flop 83 for latching the syndrome signal highest first bit SYND7 extracted from the cell delineation part 12 in the cell-based ATM physical layer receiver in response to the external synchronous clock SYNCLK, an inverter 89 for inverting the syndrome signal highest second bit SYND6 extracted from the cell delineation part 12, and a D flip-flop 84 for latching the syndrome signal highest second bit SYND6 inverted by the inverter 89 in response to the external synchronous clock SYNCLK.

Also, the sample processor 23 includes an exclusive-OR gate 85 for exclusive-ORing output signals from the D flip-flops 81 and 83, an exclusive-OR gate 86 for exclusive-ORing output signals from the D flip-flops 82 and 84, an AND gate 87 for ANDing an output signal from the exclusive-OR gate 85 and the external synchronous clock SYNCLK and outputting the ANDed signal as the first synchronous signal CRR1 to the PRBS generator 22, and an AND gate 88 for ANDing an output signal from the exclusive-OR gate 86 and the external sampling clock SAMCLK and outputting the ANDed signal as the second synchronous signal CRR0 to the PRBS generator 22.

With the above construction, the sample processor 23 compares the sample extracted from the PRBS generator 22 with the transmitter PRBS sample and outputs the synchronous signals CRR1 and CRR0 for the synchronization of the PRBS generator 22 when the samples are different from each other as a result of the comparison.

Figure 9:
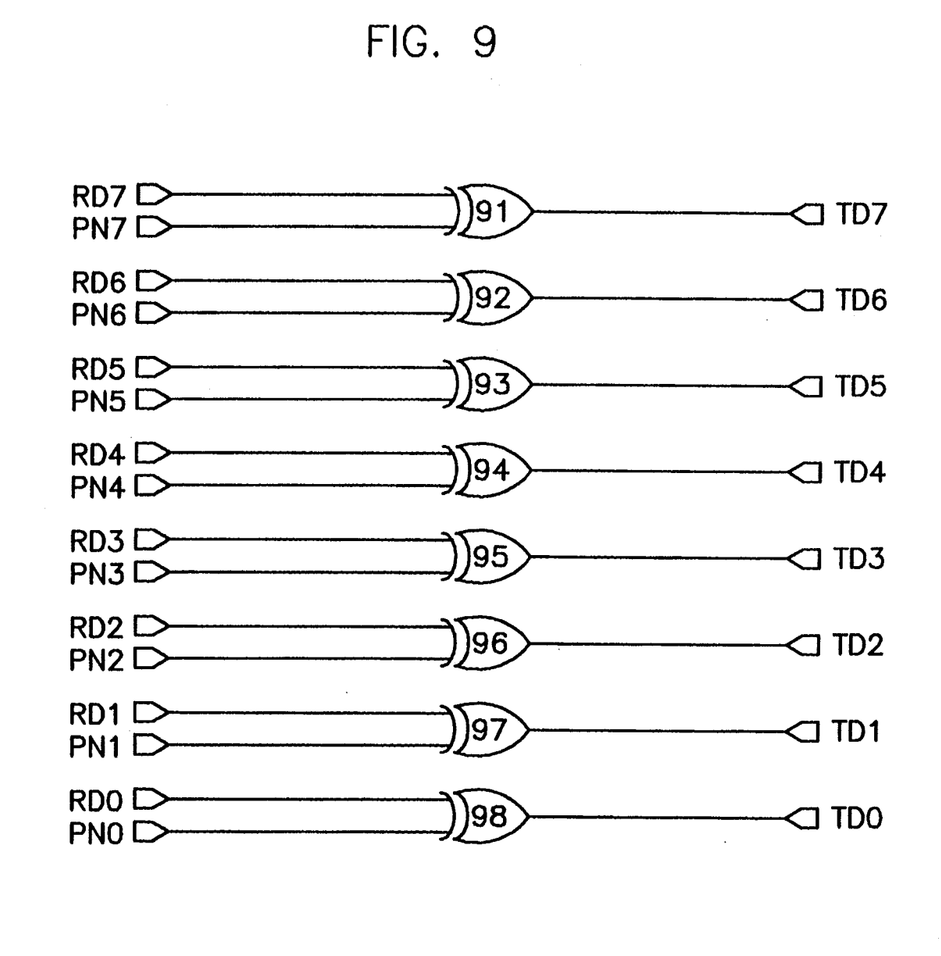
FIG. 9 is a circuit diagram of a descrambler in the descrambler partin FIG.

Referring to FIG. 9, there is shown a circuit diagram of the descrambler 21 in the descrambler partin FIG. 2. As shown in this drawing, the descrambler 21 includes a plurality of exclusive-OR gates 91–98, each of which exclusive-ORs a corresponding one of the 8 bits RD7–RD0 of the reception data and a corresponding one of the 8 bits PN7–PN0 of the random number from the PRBS generator 22 and outputs a corresponding one of the descrambled data bits TD7–TD0. The number of the exclusive-OR gates in the descrambler 21 is the same as that of the parallel reception data bits.

As apparent from the above description, according to the present invention, the parallel distributed sample descrambler partfor the cell-based ATM physical layer can be implemented so that various problems caused by a high transmission speed can be resolved with no use of a costly high-speed semiconductor device. This has the effect of making the circuit design possible regardless of the data transmission speed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A parallel distributed sample descrambling circuit for a cell-based ATM physical layer, comprising:

PRBS generation means for generating an 8-bit random number when being set to any value other than "0" in response to an initial value set signal upon initialization, to execute a generation polynomial for distributed sample descrambling given by $x^{31}+x^{28}+1$;

descrambling means for adding 8 bits of reception data to 8 bits of the random number from said PRBS generation means, respectively, to perform the descrambling of the reception data and outputting the descrambled data bits; and sample processing means responsive to an external sampling clock and an external synchronous clock, for extracting two bits for synchronization of said descrambling means from the 8-bit random number from said PRBS generation means as first and second samples, extracting highest first and second bits of a syndrome signal from a cell delineation part in a cell-based ATM physical layer receiver as transmitter PRBS samples, comparing the extracted first and second samples and the extracted syndrome signal highest first and second bits with each other and outputting first and second synchronous signals for said PRBS generation means in accordance with the compared result.

2. A parallel distributed sample descrambling circuit for a cell-based ATM physical layer, as set forth in claim 1, wherein said PRBS generation means includes:

first to fourth-stage registers connected in series, each of said first to fourth-stage registers having a set terminal for inputting the initial value set signal;

first to eighth exclusive-OR gates for inputting outputs from said third and fourth-stage registers and outputting the 8 bits of the random number, respectively;

a first correction circuit connected between output terminals of said second to eighth exclusive-OR gates and input terminals of said first-stage register, for transferring the second to eighth bits of the random number from said second to eighth exclusive-OR gates except the first bit from said first exclusive-OR gate to said first-stage register;

a second correction circuit connected between output terminals of said first-stage register and said first exclusive-OR gate and input terminals of said second-stage register, for transferring a 7-bit output from said first-stage register and the first bit from said first exclusive-OR gate to said second-stage register;

a third correction circuit connected between output terminals of said second-stage register and input terminals of said third-stage register, for transferring an 8-bit output from said second-stage register to said third-stage register; and a fourth correction circuit connected between output terminals of said third-stage register and input terminals of said fourth-stage register, for transferring an 8-bit output from said third-stage register to said fourth-stage register;

each of said first to fourth correction circuits inverting input transition data to a corresponding one of said first to fourth-stage registers in response to the first and second synchronous signals from said sample processing means.

3. A parallel distributed sample descrambling circuit for a cell-based ATM physical layer, as set forth in claim 2, wherein said first to fourth correction circuits are constructed to invert bits for correction only when the first and second synchronous signals from said sample processing means are logically "high".

4. A parallel distributed sample descrambling circuit for a cell-based ATM physical layer, as set forth in claim 1, wherein said sample processing means includes:
- a first D flip-flop for latching the first sample extracted from said PRBS generation means in response to the external sampling clock;
- a second D flip-flop for latching the second sample extracted from said PRBS generation means in response to the external synchronous clock;
- a third D flip-flop for latching the syndrome signal highest first bit extracted from the cell delineation part in the cell-based ATM physical layer receiver in response to the external synchronous clock;
- an inverter for inverting the syndrome signal highest second bit extracted from the cell delineation part;
- a fourth D flip-flop for latching the syndrome signal highest second bit inverted by said inverter in response to the external synchronous clock;
- a first exclusive-OR gate for exclusive-ORing output signals from said first and third D flip-flops;
- a second exclusive-OR gate for exclusive-ORing output signals from said second and fourth D flip-flops;
- a first AND gate for ANDing an output signal from said first exclusive-OR gate and the external synchronous clock and outputting the ANDed signal as the first synchronous signal to said PRBS generation means; and
- a second AND gate for ANDing an output signal from said second exclusive-OR gate and the external sampling clock and outputting the ANDed signal as the second synchronous signal to said PRBS generation means.

5. A parallel distributed sample descrambling circuit for a cell-based ATM physical layer, as set forth in claim 1, wherein said descrambling means includes:
first to eighth exclusive-OR gates, each of said first to eighth exclusive-OR gates exclusive-ORing a corresponding one of the 8 bits of the reception data and a corresponding one of the 8 bits of the random number from said PRBS generation means and outputting a corresponding one of the descrambled data bits.

* * * * *